United States Patent [19]
Gardner

[11] 4,208,491
[45] Jun. 17, 1980

[54] GRAFT CURING OF ELASTOMERS WITH ADSORBED MONOMERS

[75] Inventor: Irwin J. Gardner, Scotch Plains, N.J.

[73] Assignee: Exxon Research & Engineering Co., Florham Park, N.J.

[21] Appl. No.: 619,294

[22] Filed: Oct. 3, 1975

[51] Int. Cl.² .................. C08F 279/02; C08F 279/04; C08F 279/06
[52] U.S. Cl. .................. 525/254; 260/42.14; 260/42.33; 260/42.36; 260/42.44; 260/42.53; 525/245; 525/260; 525/264; 525/265
[58] Field of Search .............. 260/878 R, 879, 880 R, 260/42.14, 42.33, 42.36, 42.44, 42.53; 525/254, 260, 264, 265

[56] References Cited

U.S. PATENT DOCUMENTS

| | | | |
|---|---|---|---|
| 3,272,772 | 9/1966 | Russell | 260/42.53 |
| 3,287,309 | 11/1966 | Basdekis et al. | 260/880 R |
| 3,554,959 | 1/1971 | Hammersley et al. | 260/42.33 |
| 3,768,537 | 10/1973 | Hess et al. | 260/42.44 |
| 3,775,387 | 11/1973 | Baldwin | 526/47 |
| 3,816,371 | 6/1974 | Baldwin et al. | 526/47 |
| 3,947,429 | 3/1976 | Sagawa et al. | 260/42.14 |
| 3,968,185 | 7/1976 | Baldwin et al. | 260/878 B |

Primary Examiner—William F. Hamrock
Attorney, Agent, or Firm—John J. Mahon

[57] ABSTRACT

There is disclosed a method for crosslinking elastomers containing randomly distributed sites of conjugated olefinic unsaturation with monomers adsorbed onto granular adsorbent and dispersed into the elastomer.

14 Claims, No Drawings

GRAFT CURING OF ELASTOMERS WITH ADSORBED MONOMERS

CROSS-REFERENCE

This application is related to Baldwin et al U.S. application Ser. No. 530,613, filed Dec. 9, 1974.

BACKGROUND OF THE INVENTION

The curing of unsaturated polymers and grafting onto unsaturated elastomers is well known in the art. Such prior art produces either a non-rubbery product or product not obtainable by the easily processable mixes of the present invention.

For example, U.S. Pat. No. 3,791,655 discloses a method for preparing a hard rubber compound by grafting a carboxamide onto polybutadiene in the presence of a free radical initiator. Monomers such as styrene and vinyl toluene were used to crosslink polyvinyl chloride in U.S. Pat. No. 3,275,714, but here, as in the above-mentioned patent, the product is non-rubbery and the polymer does not contain randomly distributed sites of conjugated olefinic unsaturation. The aforesaid Baldwin et al application discloses graft curing of monomers, but the monomer must be soluble in the elastomer. The present invention overcomes this problem by providing a technique whereby the monomer may be efficiently and effectively dispersed into the elastomeric polymer. Thus, monomers generally including monomers considered not normally compatible with and soluble in the elastomer and mixtures of monomers may be used as free radical crosslinking agents in accordance with the present invention.

SUMMARY OF THE INVENTION

This invention relates to the graft curing of polymers containing randomly distributed sites of conjugated olefinic unsaturation by reacting said polymers with free radical polymerizable monomer which has been adsorbed onto a granular, nonreactive, inorganic or organic adsorbent, the adsorbed composition being dispersed into the elastomer, the reaction taking place in the presence of a free radical initiator. By means of the present invention polymeric chains of monomers, whether or not the monomer is soluble or compatible with the polymer, can be grafted onto polymers containing conjugated olefinic unsaturation while simultaneously crosslinking the entire system into an integral mass. The present invention provides an effective technique for thoroughly mixing the monomer and polymer in order to have a uniform crosslinkable product. The physical state of the adsorbed composition, that is a monomer adsorbed onto a solid adsorbent, is also desirable in that a slow addition of monomer to elastomer takes place during the course of the reaction as desorption of monomer occurs. The crosslinks are comprised of polymer chains of the chosen monomer. The overall process may be referred to as graft curing. In particular, the invention is directed to elastomers containing randomly distributed sites of conjugated olefinic unsaturation, especially such elastomers as conjugated diene butyl rubber and terpolymers of ethylene, a $C_3$ to $C_{10}$ alpha olefin and a polyene which on incorporation into the polymer deposits therein sites of conjugated olefinic unsaturation.

Heretofore, certain forming and molding techniques were not compatible with high molecular weight conjugated olefinic unsaturated polymers in view of the fact that such polymers exhibited a high viscosity. This invention enables one to use high molecular weight polymers containing conjugated olefinic unsaturation in such molding techniques as sheet molding, lay-up fabrication and even relatively low clamp pressure injection molding. Such techniques are now available to such high molecular weight polymers in view of the fact that the crosslinking free radical polymerizable monomer serves as a diluent in lowering the viscosity of the polymer.

DETAILED DESCRIPTION

The expression "butyl rubber" is used in the rubber industry to describe copolymers made from a polymerization reaction mixture having therein from 70 to 99.5% by wt. of an isoolefin which has about 4 to 7 carbon atoms, e.g., isobutylene, and about 30 to 0.5% by wt. of a conjugated multi-olefin having from about 4 to 14 carbon atoms, e.g., isoprene. The resulting copolymers contain 85 to 99.5% by wt. of combined isoolefin and about 0.5 to 15% of combined multiolefin. The preparation of butyl rubber is described in U.S. Pat. No. 2,356,128, which is incorporated herein by reference.

The polymer backbone of commercial butyl rubber is made up primarily of isobutylene units, with just a few percent of isoprene units. The isoprene units contribute the small amount of unsaturation present in butyl rubber. The basic equation is represented by:

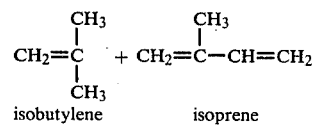

which combine in the presence of Friedel-Crafts catalysts to form:

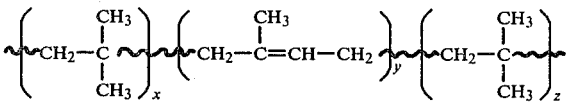

where $x+z$ represent the number of isoolefin units incorporated in the butyl rubber, while y represents the number of olefin units derived from incorporation of the diene present, substantially as randomly distributed units. The conjugated diolefin, isoprene, loses one olefinic linkage upon its essentially random incorporation into the polymer backbone.

Thus, butyl rubber, as presently produced, contains only a small percentage of unsaturation, in the form of the single double bond associated with the isoprene residue which is incorporated more or less randomly throughout the polymer chain.

Butyl rubber can be produced containing conjugated unsaturation. The general formula may be represented by:

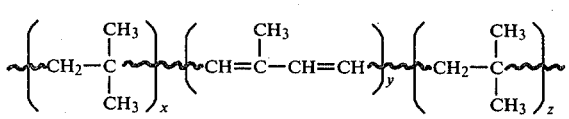

where x, y and z have the values previously described, though at least one double bond may lay outside the linear backbone. This variation may be represented by the formula:

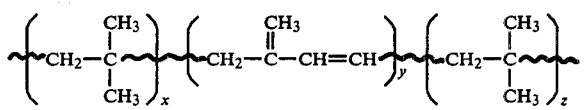

This new butyl rubber has been termed "conjugated diene butyl", hereafter referred to as CDB, regardless of the structure of the conjugated unsaturation.

CDB is more completely described in U.S. Pat. No. 3,816,371 and copending U.S. application Ser. No. 465,479. One of the preferred methods of preparing this butyl rubber is described in U.S. Pat. No. 3,775,387, all of which are incorporated herein by reference.

The CDB, containing the conjugated-olefinic unsaturation, may be prepared by dehydrohalogenation of halogenated butyl rubber.

Halogenated butyl rubber has been developed in recent years and has contributed significantly to the elastomer business. A method of preparing halogenated butyl rubber is described in U.S. Pat. No. 3,099,644, which is incorporated herein by reference. Both chlorinated and brominated butyl rubber are well known in the art. The formula for halogenated butyl rubber is representable by:

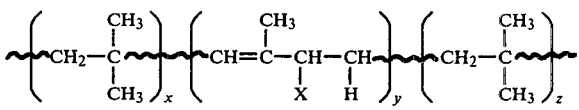

where x, y and z have the same values as for butyl rubber, described above, though this structure is but one of several which can be formed, depending on the conditions of halogenation, the halogenating agent used, etc.

The important feature depicted is that the halogen atom is on a carbon atom which is alpha to a double bonded carbon and hydrogen on the carbon atom next to that to which halogen is attached (i.e., on the carbon atom beta to the double bonded carbon).

Halogenated butyl rubber is commercially available and may be prepared by halogenating butyl rubber in a solution containing 1 to 60% by weight butyl rubber in a substantially inert $C_5$–$C_8$ hydrocarbon solvent such as pentane, hexane, heptane, etc., and contacting this butyl rubber cement with a halogen gas for a period of about 2–25 minutes. There is then formed the halogenated butyl rubber and a hydrogen halide, the polymer containing up to one or somewhat more, especially in the case of bromine, halogen atoms per double bond initially present in the polymer. This invention is not intended to be limited in any way by the manner in which butyl rubber is halogenated or dehydrohalogenated and both chlorinated and brominated butyl rubber are suitable for use in preparing CDB.

Illustrative of halogenated butyl rubber is Exxon Butyl HT 10-68 (a chlorinated butyl rubber which before halogenation analyzes ~1.8 mole % unsaturation and a viscosity average molecular weight of about 450,000). However, for the purposes of this invention, it is preferred that the butyl rubber starting material have incorporated therein from about 0.5 to 6 mole % of combined diolefin, more preferably 0.5 to 3 mole %, e.g., about 2 mole %.

Conventional high molecular weight butyl rubber generally has a number average molecular weight of about 25,000 to about 500,000, preferably about 80,000 to about 300,000, especially about 100,000 to about 250,000, and a Wijs Iodine No. of about 0.5 to 50, preferably 1 to 15. More recent low molecular weight polymers are prepared to have number average molecular weights of from 5,000 to 25,000 and unsaturation expressed as mole %, of 2–10.

A particularly advantageous method of preparing conjugated diene-containing butyl polymers comprises heating a solution of halogenated butyl rubber in the presence of a soluble metal carboxylate. Suitable metals are the polyvalent metals of Groups Ib, IIb, IVa and VIII, of the Periodic Table, having a relatively high first ionization potential and whose halides are to some extent soluble in the hydrocarbon reaction medium at the reaction temperature. Typical of these are zinc, iron, mercury, nickel, copper, tin and cadmium carboxylates.

Especially useful are the soluble carboxylic acid salts of zinc (e.g., zinc salts of naphthenic or aliphatic carboxylic acids). While useful in preparing the compositions of the present invention, potential toxicity problems which could be encountered in practicing the present invention might limit the use of certain metals, such as cadmium and mercury salts, for example.

In dehydrohalogenating the halogenated butyl rubber, zinc chloride is thought to be a by-product in the reaction. Zinc chloride, being an effective Friedel-Crafts type catalyst, may lead to molecular weight degradation or crosslinking of the halogenated polymers, depending on the structure of the polymer, the solvent being employed, the reaction temperature, etc.

This difficulty is overcome by having present in the reaction zone a metal oxide, hydroxide or carboxylate whose halogen salt is insoluble in the reaction medium.

It has been found that the mole percent of conjugated olefinic unsaturation in a typical dehydrohalogenated butyl prepared from chlorinated or brominated commercial butyl rubber, ranges from about 0.5 to about 3.0 mole %.

While the CDB may be crosslinked by a variety of reagents such as sulfur, sulfur-containing curing agents, UV radiation, polyfunctional dienophiles, and the like, there are several applications for the high reactivity rubber in which such cures are not suitable. Moreover, simple crosslinking of the elastomer cannot supply the alterations in vulcanizate properties provided by the graft curing technique.

Thus, if high molecular butyl is to be used for low pressure injection molding, conventional fabrication techniques are not suitable in view of its excessive viscosity.

It will be readily evident to those skilled in the art that the practice of this invention is not limited to butyl rubber, but, applies to any elastomer containing randomly distributed sites of conjugated olefinic unsaturation.

Illustrative of such an elastomer containing conjugated olefinic unsaturation other than CDB, would be the elastomeric copolymer of ethylene, a $C_3$ to $C_{10}$ alpha olefin, and a 5,6-di-methylene-2-norbornene as taught in U.S. Pat. No. 3,681,309 which is incorporated herein by reference.

This elastomeric copolymer of ethylene may be prepared by first forming a monomer mixture containing ethylene as a first component, a $C_3$ to $C_{10}$ alpha olefin as a second component, and a 5,6-dimethylene-2-norbornene as a third component, and then polymerizing this mixture in the presence of a compound of a transition metal as catalyst and an organometal compound as cocatalyst, thereby forming a copolymer of ethylene, a $C_3$ to $C_{10}$ alpha olefin, and a 5,6-dimethylene-2-norbornene, wherein the copolymer contains conjugated residual unsaturation derived from the 5,6-dimethylene moiety of said norbornene; and withdrawing said copolymer as product.

The ethylene used in preparation of this terpolymer may typically be purified commercially available ethylene of greater than 99.98% purity, typically 99.98%–99.999%, say 99.99%. It may contain less than 0.02%, typically 0.001%–0.02%, say 0.01% non-olefinic impurities, and less than 0.001%, say 0.0001%–0.0005% water.

The alpha olefin, also called a terminal olefin, may be a purified commercially available $C_3$ to $C_{10}$ olefin, having a purity of greater than 99.98%, typically 99.98%–99.999%, say 99.99%. It may contain less than 0.02%, say 0.001%–0.02%, say 0.01% non-olefinic impurities and less than 0.001%, say 0.0001%–0.0005% water.

Non-polar impurities, such as ethane or other hydrocarbons may be present, but for best results, polar compounds such as oxygen, water, carbon dioxide, carbon monoxide may be maintained at the indicated low levels in the ethylene and alpha olefin feeds.

The alpha olefins having three to ten carbon atoms, may be designated by the formula $R'-CH=CH_2$ wherein $R'$ is hydrocarbon and typically selected from the group consisting of alkyl, alkaryl, aralkyl, and aryl. Most preferably $R'$ may be a fully saturated alkyl including cycloalkyl. Alpha olefins may include typically: propene, butene-1, pentene-1, 3-methyl butene-1, hexene-1, 3-methyl pentene-1, 4-methyl pentene-1, heptene-1, 3-methyl hexene-1, 4-methyl hexene-1, 5-methyl hexene-1, 3-ethyl pentene-1, octene-1, 3-methyl heptene-1, 4-methyl heptene-1, 5-methyl heptene-1, 6-methyl heptene-1, 3-ethyl hexene-1, 4-ethyl hexene-1, 3-propyl hexene-1, and decene-1.

The preferred alpha olefin may be propylene, i.e. propene.

The polyene may include those inertly substituted compounds having the Formula I wherein the carbon atoms are designated by number for easy reference.

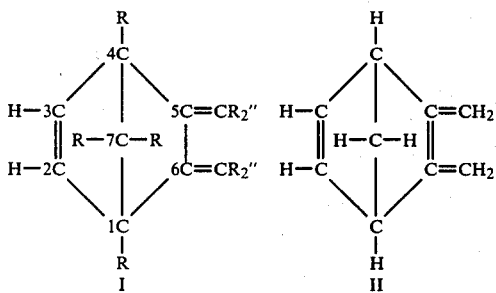

In the Formula I, each of the R and R" groups may be hydrogen or hydrocarbon and preferably independently selected from the group consisting of hydrogen, alkyl, alkaryl, aralkyl, and aryl. When R or R" is alkyl, it may be methyl, ethyl, propyl, isopropyl, butyl, hexyl, octyl, decyl, etc. When R or R" is alkaryl, it may be tolyl, xylyl, etc. When R or R" is aralkyl, it may be benzyl, etc. When R or R" is aryl, it may be phenyl, naphthyl, etc. The preferred R and R" groups may be alkyl and aryl having up to 12 carbon atoms.

In the preferred embodiment, the R groups may be hydrogen. In the most preferred embodiment, R and R" are hydrogen, and the composition is 5,6-dimethylene-2-norbornene.

Typical 5,6-dimethylene-2-norbornene compounds which may be employed may include: 5,6-dimethylene-2-norbornene, 1-methyl-5,6-dimethylene-2-norbornene, 1-ethyl-5,6-dimethylene-2-norbornene, 1-butyl-5,6-dimethylene-2-norbornene, 7-methyl-5,6-dimethylene-2-norbornene, 7-butyl-5,6-dimethylene-2-norbornene, 1-cyclohexyl-5,6-dimethylene-2-norbornene, 7-methyl-5,6-dimethylene-2-norbornene, 7-propyl-5,6-dimethylene-2-norbornene, 7-ethyl-5,6-dimethylene-2-norbornene and 1-phenyl-5,6-dimethylene-2-norbornene.

These materials may be readily available or they may be prepared by procedures well known to those skilled in the art.

Formation of these copolymers may be effected by forming a mixture of the three components containing the following molar parts: (1) ethylene, 1,000–2,500, preferably 1,250–1,900, most preferably about 1,700; (2) alpha-olefin, 1,600–7,500, preferably 2,000–3,300, most preferably about 2,500; (3) 5,6-dimethylene-2-norbornene, 15–200, preferably 25–40, most preferably about 30.

Mixtures of these compounds may be used, i.e. more than one alpha olefin and/or more than one 5,6-dimethylene-2-norbornene may be employed. Other compatible components, including those which are copolymerizable to form tetrapolymers may be present including, e.g. aromatic mono-olefins such as styrene, etc.

The following may be representative of copolymers which may be prepared by the process of this invention:

ethylene/propylene/5,6-dimethylene-2-norbornene;
ethylene/propylene/1-methyl-5,6-dimethylene-2-norbornene;
ethylene/propylene/1-ethyl-5,6-dimethylene-2-norbornene;
ethylene/1-butene/5,6-dimethylene-2-norbornene;
ethylene/1-hexane/5,6-dimethylene-2-norbornene;
ethylene/4-methyl-1-hexene/7-methyl-5,6-dimethylene-2-norbornene;
ethylene/1-decene/1-cyclohexyl-5,6-dimethylene-2-norbornene.

A wide variety of nonreactive granular inorganic and organic adsorbents, such as the adsorptive activated carbons and the like may be used in the present invention, both low surface area and high surface area adsorbents are suitable, the only limitation being that the adsorbent does not interfere with the free radical polymerization reaction while adsorbents, particularly inorganic adsorbents, having a surface area of 50 $M^2$/gram and more such as at least about 100–200 $M^2$/gram, are preferred for use in the present invention. Relatively lower, e.g. 5 $M^2$/gram, surface area adsorbents are also useful. Exemplary inorganic adsorbents are the clays and acid treated clays such as kaolinite, montmorillonite, fuller's earth, bentonite and similar hydrated aluminum silicate clays; silica and silicate adsorbents such as diatomite, kieselguhr, pyrogenic silica, silica gel, talc, magnesium silicate, alumina, activated alumina, alumina trihydrate, alumino silicate and the zeolite adsorbents; inorganic metallic oxide and carbonate adsorbents such as whiting ($CaCO_3$), magnesia and magnesium carbonate, zinc oxide and zinc carbonate, titanium dioxide, as well as the sulfates of potassium, sodium, barium, magnesium and similar metals which will not adversely effect free radical polymerization.

The term "nonreactive" means that the adsorbent functions by physical adsorption of the adsorbate monomer onto its surface and does not inhibit the free radical polymerization of the adsorbate monomers more fully described herein.

Suitable organic adsorbents include the highly adsorptive activated carbons and charcoals, cellulosic fibers, adsorptive organic resins which are nonreactive with the elastomer-monomer components.

Particularly preferred adsorbents for use in the present invention are the high surface area silica adsorbents, such as pyrogenic silica and the clay adsorbents such as kaolinite clay, these adsorbents having surface areas of 50–200 $M^2$/grams and higher. These silica adsorbents can offer the additional advantage of not adversely effecting color and transparency of the finished products, since cured polymers having these qualities are highly desirable in many practical uses, such as flexible transparent sheeting.

In the practice of the present invention, the polymerizable monomer is first combined with the adsorbent by simple admixture of these two components, the weight ratio of monomer to adsorbent varying broadly over the range of about 100:1 to 1:1 with the preferred ratios being in the range of about 3:1 to 20:1. Wide variation is permissible since adsorbents useful in the present invention are capable of adsorbing a quantity of monomer many times their own weight. Order of addition of the adsorbent and adsorbate is not critical and the adsorbent may be added to the monomer or vice versa.

The adsorbed monomer may be quickly and conveniently admixed with the polymer in a low shear mixer. Problems heretofore encountered in attempting to blend insoluble or incompatible monomers or monomers which are only slightly soluble in the polymer are thusly overcome. A particular problem is the tendency of the polymerizable monomer to inhibit a thorough mixing with the elastomeric polymer because of the tendency of the monomer to act as a lubricant. In the present invention, the mixture of adsorbent and monomer becomes a solid mass with no free liquid present and this admixture in granular form is readily dispersable into the elastomer. This increases processing efficiency since low and careful mixing, heretofore practiced in such graft curing procedures to insure solution or dispersion of monomer in polymer, is rendered unnecessary.

Illustrative of free radical polymerizable monomers useful in the present invention are the various acrylic monomers such as acrylic acid, methacrylic acid and similar beta-alkyl substituted derivatives in which the alkyl group contains 1 to 8 carbon atoms such as ethyl-, propyl-, butyl-, amyl-, hexyl-, heptyl- and octylacrylic acid, phenyl acrylic acid, vinyl acrylic acid and the like; acrylate monomers such as methyl acrylate, methyl methacrylate, ethyl acrylate, butyl metacrylate, butyl acrylate, acrylamide, methacrylic anhydride, alkylamino, dialkyl amino acrylates and the like. Also suitable are the styrene monomers and various substituted derivatives thereof such as styrene, alphamethyl styrene, amino styrene, methylethyl amino styrene, methoxy styrene, chloro styrene, dichlorostyrene, di- or trimethyl styrene, t-butyl styrene, sodium styrene sulfonate, p-benzyl styrene, p-phenoxy styrene and similar aryl substituted styrenes.

Further illustrations of free radical polymerizable monomers useful in the practice of the present invention are monomers containing carboxylic acid ester, or anhydride groups such as maleic anhydride, fumaric acid, crotonic acid, itaconic acid and anhydride, maleimide and fumarates such as diethyl fumarate and dioctyl fumarate; conjugated dienes such as 1,3-butadiene, isoprene, piperylene, methyl pentadiene, chloroprene and methoxy, ethoxy and cyano derivatives of conjugated dienes such as 2-methoxybutadiene, 1-cyanobutadiene. Acrylonitrile and derivatives thereof such as methacrylonitrile are also suitable.

A broad category of free radical polymerizable monomers useful in the present invention are the various vinyl monomers and vinylidene monomers such as vinyl acetate, vinyl acetylene, vinyl chloride, vinylene carbonate, vinyl-2-chloroethyl ether, vinylidene chloride, $C_8$–$C_{18}$ alkyl vinyl ethers, vinyl esters of $C_8$–$C_{18}$ fatty acids, 2-vinyl furan, vinyl phenol, vinyl phenyl disiloxane, 2- and 4-vinylpyridene, vinyl pyrrole, vinyl pyrrolidene, vinyl sulfonic acid, vinyl urethane, methyl vinyl ketone, 2-vinylquinoline, vinyl carbazole as well as divinyl monomers such as 2,3-divinyl pyridine, divinyl sulfone and 2,5-divinyl-6-methyl pyridine. Other monomers include silanes such as propenyl triethoxy silane, tris-(trimethyl siloxy)vinyl silane, vinyl ethyl diethoxy silane and the like.

The term "polymerizable monomer" as used herein is meant to describe a monomer or mixture of two or more monomers capable of forming either homo- or copolymers of number average molecular weight 500 or greater at the graft curing temperature but independently of the graft curing process. Preferably the monomer or monomers employed are liquids or solids at the mixing temperatures and hydrostatic pressures employed in the process of the present invention, normally room temperature and atmospheric pressure, but gaseous monomers are not excluded from the present invention since processing conditions can be readily adapted to ensure adsorption and dispersion into the elastomer.

Other useful monomers for this invention may be selected from the list of free radical polymerizable monomers shown in "Appendix A, Appendix B" of the book *Copolymerization* by George E. Ham, Interscience Publishers (1964) on pages 695 to 863.

Graft curing of the elastomeric polymer, such as conjugated diene butyl, is accomplished by reacting the polymer in the presence of a free radical initiator with the dispersed adsorbent adsorbate composition containing the free radical polymerizable monomer for a time long enough to decompose most of the free radical initiator or convert most of the monomer to polymer. The dispersion of monomer-adsorbent provides an additional processing advantage in that the desorption of the monomer into the elastomer allows a slow addition of monomer to polymer to take place. The monomer polymerizes and these polymeric chains of monomer become involved in the crosslinks connecting the elastomeric chains.

While not wishing to be bound by theory, it is believed that the elastomer chains are crosslinked and the crosslinks are polymeric chains of the monomer. Some monomer chains may connect two or more elastomer chains or two or more points in a given elastomer chain while some monomer chains may not be connected to the network at all. On the other hand, some will be connected to the elastomer at only one point and, therefore, be a simple graft. The number and type of such chains will depend on the amount of the various reactants and their relative reactivity.

It is preferred that the elastomer suitable for use in the present invention have from 0.15 to about 10 mole % conjugated olefinic unsaturation. The amount of free radical polymerizable monomer suitable for use in this invention is preferably a total of at least 1 mole of polymerizable groups per mole of conjugated olefinic unsaturation in the elastomer.

Polyfunctional free radical monomers can also be incorporated with or in place of the simple free radical polymerizable monomer. When polyfunctional free radical polymerizable monomers are used *with* the free radical polymerizable monomer, crosslinks are produced within the monomer chains so that not only is the elastomer crosslinked via monomer chains, but the monomer chains themselves may be crosslinked as below:

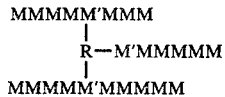

where M is a free radical polymerizable monomer and $R(M')_n$ is a polyfunctional free radical polymerizable monomer wherein n is the number of polymerizable groups.

Polyfunctional monomers, as used in this invention, are defined as those monomers containing two or more polymerizable groupings chosen from those groupings which define a simple monomer (only one polymerizable grouping). For example, styrene would be a simple monomer and di- and tri- vinyl benzene would be corresponding polyfunctional monomers. Another example would be propyl methacrylate representing the simple monomer and 1,3 propane dioldimethacrylate, 1,2 propanol diol dimethacrylate and trimethylol propane trimethacrylate representing corresponding polyfunctional monomers. These polyfunctional monomers, to be useful in this invention, would usually be liquid or solid at room temperature and atmospheric pressure as indicated previously.

The process disclosed in this invention enables one to vary not only the physical properties but also the chemical properties of the product over a wide range, depending on both the amounts and the nature of the particular monomers used.

The free radical initiators which are suitable for use in the present invention include irradiation; organic peroxides; organic hydroperoxides and azo compounds.

Illustrative of some peroxides useful in this invention include the dialkyl and diacyl peroxides.

The dialkyl peroxides have the general structure R OO R', where R and R' can be the same or different primary, secondary or tertiary alkyl, cycloalkyl, aralkyl, or heterocyclic radicals. Included in this group of peroxides which are suitable for use in this invention are dicumyl peroxide, di-t-butyl peroxide, t-Butylcumyl peroxide and 2,5-Dimethyl-2, 5-bis (t-butyl peroxy) hexane.

Diacyl peroxides have the general structure RC(O)OOC(O)R' where R and R' are the same or different alkyl, cycloalkyl, aralkyl, aryl or heterocyclic radicals. Illustrative of some diacyl peroxides suitable for use in this invention are dilauroyl peroxide, dibenzoyl peroxide, dicetyl peroxide, didecanoyl peroxide, di (2,4-dichlorobenzoyl) peroxide, diisononanoyl peroxide and 2-methylpentanoyl peroxide.

As will be evident to those skilled in the art any organic peroxide or other free radical or sources thereof which are useful in crosslinking polymers or initiating polymerization are encompassed in the present invention.

The basis for choice of free radical initiators for use in this invention include such things as the half life of the initiator at the mixing and/or curing temperature of the selected initiator in the system.

Examples of hydroperoxides which are suitable for use in the present invention include t-butyl hydroperoxide, cumyl hydroperoxide, 2,5-dimethyl-2,5 dihydroperoxyhexane, p-methane hydroperoxide and diisopropylbenzenehydroperoxide.

Examples of some azo compounds which are suitable for use as free radical initiators in this invention include diazoaminobenzene, N,N'-dichloroazodicarbonamide, azo dicarboxylic acid diethyl ester and azo bis (isobutyronitrile).

Irradiation suitable for use in this invention include alpha radiation, gamma radiation, UV radiation and electron beam radiation or any other high-energy radiation regardless of the source of energy (photons, protons, electrons, neutrons, etc.).

Tertiary amines can also be used in this invention to promote decomposition of the organic peroxide. To be suitable in this invention, the tertiary amine must be dispersible or soluble in the mixture employed at curing temperature. Illustrative of such suitable tertiary amines are triethylamine, tributylamine, 2,4,6-tris (dimethylamino) phenol, and 3,3,7,7-tetramethylbicyclo (3,3,0) octane.

Other useful free radical initiators are peroxyesters such as t-butyl peroctoate, peroxydicarbonates such as bis (4-t-butyl cyclohexyl) peroxydicarbonate and nonperoxy compounds which generate free radicals under reaction conditions such as those of the formula

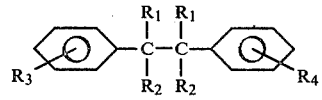

where $R_1$ is CN, $R_2$ is $C(:O)OC_2H_5$ and $R_3$ and $R_4$ may be hydrogen, p-methoxy, p-methyl or 2,4-dimethyl.

Metal carboxylates may also be used in this invention to accelerate decomposition of the peroxides to radical fragments. Illustrative of metal carboxylates suitable for use in this invention are the naphthenates, octoates and tallates of metals selected from the group consisting of aluminum, cobalt, vanadium, copper, calcium, lead, mercury, zinc, manganese, magnesium, zirconium and iron.

It will be evident to those skilled in the art that a mixture of peroxide with varying half life at a given temperature can be used to control the polymerization reaction. Also apparent to those skilled in the art is the mixing of conventional fillers, oils, etc. with the elastomer monomer mixtures of this invention as well as the inclusion of various special purpose additives such as antioxidants, UV stabilizers, screening agents and protective agents, provided the aforesaid additives do not interfere with free radical polymerization.

The products produced in accordance with the present invention constitute a further embodiment thereof and have a variety of uses and applications, particularly transparent and colorless graft cured elastomers of the present invention. These include flexible sheet moldings, laminates and panels, extruded products such as transparent tubing and weatherstripping, automotive parts such as flexible tail and parking light lenses and transparent casings for interior lights and instruments, packaging films and similar uses where flexibility, transparency and structural strength are the desired properties. They are also useful adhesives.

The invention is further illustrated by the following examples which should not be considered as limitative of its scope.

EXAMPLE 1

Portions of conjugated diene butyl (CDB) were pre-swelled with styrene and mixed with adsorbed methacrylic acid or CDB (neat) was mixed with adsorbed methacrylic acid, or CDB pre-swelled with styrene was transferred to a Brabender Plastograph mixer and methacrylic acid (neat) was added dropwise to the mixer. To all of these there followed the addition of the free radical initiator.

In Table I are listed the materials employed and the cure conditions and physical properties of the graft cured CDB samples. In compounds designated A, B, C and F the CDB was pre-swelled with styrene. In compounds A, B, C, D and E the methacrylic acid was quantitatively piped into a small beaker and "Aerosil-200" a high surface area pyrogenic silica was added while stirring. The liquid was very rapidly adsorbed onto the silica. In compounds C and E hexane dioldimethacrylate (HDDMA) was included as a bifunctional crosslinking agent. The HDDMA was also adsorbed on the silica. In compound F the methacrylic acid was added dropwise to the CDB polymer during the mixing operation over a period of approximately 30 minutes.

The mixing cycle for compounds A to E was: 0 minutes, add CDB (with styrene); 3 minutes, add adsorbed monomers; 6 minutes, add free radical initiators: 8 minutes, dump.

Cold water was circulated through the Brabender mixer cooling jacket. The stock temperature determined by a thermocouple was approximately 30° C. The mixing rate was 69 rpm. After mixing the stock was transferred to bottles and stored under nitrogen.

Portions of each mix were cured into 7.62 cm. by 7.62 cm by 0.15 cm. pads at 110° C. for 40 minutes. The graft cured compounds A to F were transparent and essentially colorless. The results of the tensile tests, hardness determinations and response to various swelling liquids are also listed in Table I. All the compounds enjoyed very high levels of insolubles in both polar and non-polar solvents. Compound E displayed the highest resistance to swell by either the polar or non-polar solvents. In particular, compound E displayed very attractive resistance to attack by ASTM Oil No. 3 at 100° C. putting it in the class of polychloroprenes with respect to this test. Tensile strengths were quite good for all the cures, the best in this category being compound B which contained equal weights of styrene and methacrylic acid. A very high level of insolubles in MEK (methylethyl ketone, solvent for polystyrene and polymethacrylic acid) and toluene (polystyrene and CDB solvent) or cyclohexane which is a solvent for CDB, indicates that a true graft polymerization had been achieved in all cases.

TABLE I

PREPARATION OF GRAFT CURES OF CDB WITH SOLUBLE AND/OR INSOLUBLE FREE RADICAL POLYMERIZABLE MONOMERS

| Compound[1] | A | B | C | D | E | F |
|---|---|---|---|---|---|---|
| CDB[2] | 37.20 | 34.40 | 34.37 | 42.53 | 40.22 | 37.94 |
| Styrene, ml | 12.41 | 11.35 | 11.34 | — | — | 12.52 |
| Methacrylic acid, ml | 5.64 | 10.16 | 7.45 | 12.56 | 11.88 | 5.60 |
| "Aerosil 200"[3], g | 1.276 | 1.166 | 1.030 | 1.270 | 1.200 | — |
| HDDMA, ml | — | — | 2.76 | — | 3.22 | — |
| t-Butyl Peroctoate, ml | .576 | .580 | 0.582 | 0.586 | 0.590 | 0.580 |
| "Percadox-16"[4], g | .056 | .055 | 0.055 | 0.055 | 0.056 | 0.057 |
| Cure Conditions 40' @ 110° C. Physical Properties | | | | | | |
| Tensile MPa (mega-Pascals) | 11.71 | 18.05 | 13.38 | 13.99 | 12.15 | 11.99 |
| Elongation, % | 210 | 267 | 134 | 200 | 120 | 250 |
| Shore A | 68 | 78 | 78 | 83 | 85 | 65 |
| Swell Ratio[5]/% Insoluble | | | | | | |
| Toluene, 25° C./48 hrs. | 1.52/97.6 | 1.26/98.4 | 1.17/98.1 | 1.02/97.6 | 0.91/98.0 | 1.66/97.6 |
| MEK 25° C./48 hrs. | 0.28/98.2 | 0.28/99.0 | 0.26/98.7 | 0.29/98.4 | 0.26/99.0 | 0.29/98.0 |
| ASTM Oil #3 100° C./70 hrs. | 1.43/ | 1.23/ | 1.07/ | 0.96/ | 0.82/ | 1.56/ |
| Cyclohexane 25° C./48 hrs. | | 1.60/96.0 | | 1.34/96.0 | | |

[1] Mixed in 60 ml capacity Brabender - cam blades
[2] 1.29 mole % conjugated diene, 0.24 wt. % Cl
[3] pyrogenic $SiO_2$: BET surface area $200 \pm 25$ $m^2/g$
[4] Bis (4-t-butylcyclohexyl) Peroxydicarbonate
[5] Swell Ratio = $\frac{\text{wt. swollen Sample} - \text{Wt. dried Sample}}{\text{Wt. dried sample}}$

EXAMPLE 2

CDB was reacted with acrylonitrile and styrene. The CDB was pre-swelled with styrene. Experimental details and results are set forth in Table II. The acrylonitrile was adsorbed onto the silica as described in Example 1. These cures exhibit useful properties and resistance to swell by toluene.

TABLE II
GRAFT CURE OF CDB WITH STYRENE AND ACRYLONITRILE

| Compound | A | B |
|---|---|---|
| CDB, g. | 33.27 | 33.00 |
| Styrene, ml | 16.69 | 13.06 |
| Acrylonitrile, ml | 5.98 | 9.90 |
| "Aerosil 200", g | 1.20 | 1.20 |
| t-butyl peroctoate | 0.564 | 0.560 |
| "Percadox-16", g | 0.053 | 0.053 |
| Cure Conditions 40' 169 110° C. | | |
| Swell Ratio/% Insolubles | | |
| Toluene, 25° C./48 hrs. | 2.10/98.2 | 1.83/98.3 |
| MEK, 25° C./48 hrs. | 0.58/97.8 | 0.56/98.0 |
| ASTM Oil #3, 100° C./70 hrs. | 1.46/ | 1.50/ |
| Tensile Properties | | |
| Tensile, MPa | 7.72 | 5.00 |
| Elongation, % | 163 | 120 |
| Shore A | 66 | 63 |

(See Table I footnotes for identification of ingredients)

EXAMPLE 3

In this example a kaolinite clay, "Hydrite PX", was used to adsorb the methacrylic acid. This clay was used in relatively larger quantities than the silica adsorbent of the preceding examples. The average primary particle size of "Hydrite PX" is about $0.6 \times 10^{-6}$ meter compared to about $1 \times 10^{-8}$ meter for "Aerosil 200". The cured pads were opaque due to the high content of adsorbent in this example. The physical properties of compound A and its resistance to attack by toluene or cyclohexane were very acceptable. In Table III the results of the example are set forth. In compound C there was used "Lupersol 231" a peroxyketal:1,1-bis(t-butylperoxy)3,3,5-trimethylcyclohexane in place of the free radical initiator used in the preceding examples. The tensile strength of the products was slightly lower and the cured pad was softer than compound A, but still quite acceptable. This illustrates an ability to use a variety of free radical initiators in this invention. Compound F illustrates the effect of leaving out the methacrylic acid in the graft cures. In this case the quantity of styrene employed was equal in weight to the quantity of styrene plus methacrylic acid in compounds A and C of this example. The absence of methacrylic acid (comparing C and F) results in a much lower tensile strength and much lower resistance to attack by aliphatic and aromatic solvents.

TABLE III
EFFECT OF OTHER ADSORBENTS AND POLYMERIZATION INITIATORS

| Compound | A | C | F |
|---|---|---|---|
| CDB, g | 31.12 | 31.12 | 31.12 |
| Styrene, ml | 10.24 | 10.24 | 20.54 |
| Methacrylic Acid, ml | 9.17 | 9.17 | — |
| "Hydrite PX", g | 15.52 | 15.52 | 15.56 |
| t-Butyl Peroctoate, ml | 0.53 | — | — |
| "Percadox-16", g | 0.06 | — | — |
| "Lupersol 231", ml | — | 0.60 | 0.60 |
| Cure Conditions min/°C. | 40/110 | 40/135 | 40/135 |
| Physical Properties | | | |
| Tensile, MPa | 15.49 | 12.86 | 4.30 |
| Elongation, % | 170 | 207 | 513 |
| Shore A | 84 | 74 | 40 |
| Swell Ratio/% Insolubles | | | |
| Toluene | 0.85/99.0 | 0.98/98.0 | 3.32/81.6 |
| Cyclohexane | 0.99/96.8 | 1.23/96.2 | 4.50/80.4 |

(Same ingredients as identified in Table I except for "Lupersol 231 and Hydrite PX")

What is claimed is:

1. A method of crosslinking elastomers containing randomly distributed sites of conjugated olefinic unsaturation, from about 0.15 to about 10 mole % of conjugated olefinic unsaturation being present, which comprises reacting said elastomers with a free radical polymerizable monomer or mixture of said monomers adsorbed into an inorganic non-reactive granular adsorbent, the adsorbent having a surface area of at least 50 $m^2$/gram, said adsorbed monomer being dispersed in the elastomer, the weight ratio of monomer to adsorbent being from about 100:1 to 1:1 and in the presence of at least one free radical initiator.

2. The method of claim 1 wherein the total quantity of polymerizable groups in the monomer or monomers employed is at least 1 mole per mole of conjugated olefinic unsaturation in the elastomer.

3. The method of claim 1 wherein the elastomer is conjugated diene butyl.

4. The method of claim 1 wherein the elastomer is a terpolymer of ethylene, a $C_3$ to $C_{10}$ alpha olefin and a polyene.

5. The method of claim 1 wherein the adsorbent is a silica adsorbent.

6. The method of claim 1 wherein the adsorbent is a clay adsorbent.

7. The method of claim 1 wherein the monomer is an acrylic acid or acrylate monomer.

8. The method of claim 7 wherein the monomer is methacrylic acid.

9. The method of claim 1 wherein the monomer is acrylonitrile.

10. The method of claim 1 wherein a monomer mixture is used, the mixture containing styrene.

11. The method of claim 1 wherein the monomer is a polyfunctional monomer.

12. The method of claim 1 wherein the monomer is a vinyl or vinylidene monomer.

13. The method of claim 1 wherein the monomer contains carboxylic acid, ester or anhydride groups.

14. The method of claim 1 wherein the monomer is a conjugated diene.

* * * * *